(12) United States Patent
Niarfeix (10) Patent No.: US 7,290,351 B2
(45) Date of Patent: Nov. 6, 2007

(54) MOUNTING BRACKET, ROLLING BEARING AND CORRESPONDING ASSEMBLY METHOD

(75) Inventor: François Niarfeix, Cerelles (FR)

(73) Assignee: Aktiebolaget SKF, Göteborg (SE)

( * ) Notice: Subject to any disclaimer, the term of this patent is extended or adjusted under 35 U.S.C. 154(b) by 165 days.

(21) Appl. No.: 10/503,400

(22) PCT Filed: Jan. 28, 2003

(86) PCT No.: PCT/FR03/00264

§ 371 (c)(1),
(2), (4) Date: May 23, 2005

(87) PCT Pub. No.: WO03/065051

PCT Pub. Date: Aug. 7, 2003

(65) Prior Publication Data
US 2005/0235513 A1    Oct. 27, 2005

(30) Foreign Application Priority Data
Jan. 29, 2002    (FR) .................................. 02 01052

(51) Int. Cl.
*G01D 21/00* (2006.01)
(52) U.S. Cl. ................... 33/645; 33/613; 384/617
(58) Field of Classification Search .......... 33/645, 33/613
See application file for complete search history.

(56) References Cited

U.S. PATENT DOCUMENTS

| | | | |
|---|---|---|---|
| 1,368,068 A * | 2/1921 | Stein et al. ................ 24/282 |
| 4,029,186 A | 6/1977 | De Gennes | |
| 4,046,238 A | 9/1977 | Mendoza-Orozco | |
| 4,319,220 A | 3/1982 | Pappas et al. | |
| 4,478,595 A | 10/1984 | Hayakawa et al. | |
| 4,601,374 A | 7/1986 | Ladin | |
| 4,608,741 A | 9/1986 | Mallet | |
| 4,699,530 A | 10/1987 | Satoh et al. | |
| 4,815,867 A | 3/1989 | Ladin | |

(Continued)

FOREIGN PATENT DOCUMENTS

DE    4228899    3/1994

(Continued)

OTHER PUBLICATIONS

Rapport D'Examen Preliminaire International for PCT/FR02/00359, Date d'achevement du present rapport Dec. 13, 2002 (6 pages).

(Continued)

*Primary Examiner*—Yaritza Guadalupe-McCall
(74) *Attorney, Agent, or Firm*—Meyertons, Hood, Kivlin, Kowert & Goetzel, P.C.; Eric B. Meyertons (57) ABSTRACT

A bracket includes a fixing piece on a rotation element (3), said fixing piece comprising a body (22) in the general form of a ring, provided with an annular radial projection (23). The body includes an opening (33) which permits a variation in the diameter of said body (22) on assembly with engagement of the projection (23) in a corresponding groove (9) on the rotation element (3) to give a radial interference fit. A bar (28) prevents a variation in the diameter of the body (22) as above after the assembly thereof.

13 Claims, 8 Drawing Sheets

U.S. PATENT DOCUMENTS

| | | | |
|---|---|---|---|
| 4,854,436 A | 8/1989 | Lassiaz et al. | |
| 4,872,768 A | 10/1989 | Brandenstein et al. | |
| 4,874,073 A | 10/1989 | Tagawa | |
| 4,881,629 A | 11/1989 | Gay et al. | |
| 4,946,295 A | 8/1990 | Hajzler | |
| 4,957,133 A | 9/1990 | Linz et al. | |
| 5,008,647 A | 4/1991 | Brunt et al. | |
| 5,018,384 A | 5/1991 | Hayashi et al. | |
| 5,033,013 A | 7/1991 | Kato et al. | |
| 5,264,790 A | 11/1993 | Moretti et al. | |
| 5,372,435 A | 12/1994 | Genero et al. | |
| 5,575,568 A | 11/1996 | Rigaux et al. | |
| 5,592,401 A | 1/1997 | Kramer | |
| 5,598,913 A | 2/1997 | Monahan et al. | |
| 5,620,209 A * | 4/1997 | Sauer | 285/23 |
| 5,713,577 A | 2/1998 | Lannert et al. | |
| 5,721,539 A | 2/1998 | Goetzl | |
| 5,780,731 A | 7/1998 | Matsui et al. | |
| 5,845,230 A | 12/1998 | Lamberson | |
| 5,865,288 A | 2/1999 | Thomire et al. | |
| 5,877,431 A | 3/1999 | Hirano | |
| 6,011,491 A | 1/2000 | Goetzl | |
| 6,013,007 A | 1/2000 | Root et al. | |
| 6,035,990 A | 3/2000 | Peschke | |
| 6,043,643 A | 3/2000 | Message et al. | |
| 6,056,446 A | 5/2000 | Welter et al. | |
| 6,109,624 A | 8/2000 | Message et al. | |
| 6,160,480 A | 12/2000 | Su-yueh | |
| 6,196,552 B1 | 3/2001 | Peterson et al. | |
| 6,267,512 B1 | 7/2001 | Beghini et al. | |
| 6,323,640 B1 | 11/2001 | Forestiero et al. | |
| 6,338,576 B1 | 1/2002 | Girardin et al. | |
| 6,415,900 B1 | 7/2002 | Lopez et al. | |
| 6,539,336 B1 | 3/2003 | Vock et al. | |
| 6,611,138 B2 | 8/2003 | Vasiloiu | |
| 6,612,749 B2 | 9/2003 | Arnault et al. | |
| 6,666,784 B1 | 12/2003 | Iwamoto et al. | |
| 6,746,352 B1 | 6/2004 | Poiret et al. | |
| 6,908,229 B2 | 6/2005 | Landrieve et al. | |
| 2003/0002764 A1 | 1/2003 | Pflugner et al. | |
| 2003/0007631 A1 | 1/2003 | Bolognesi et al. | |
| 2004/0013334 A1 | 1/2004 | Landrieve et al. | |
| 2004/0141669 A1 | 7/2004 | Landrieve et al. | |
| 2004/0154895 A1 | 8/2004 | Thomire et al. | |
| 2004/0202392 A1 | 10/2004 | Niarfeix et al. | |
| 2005/0008276 A1 | 1/2005 | Beghini et al. | |
| 2005/0011717 A1 | 1/2005 | Arnault | |
| 2005/0011718 A1 | 1/2005 | Arnault | |
| 2005/0089255 A1 | 4/2005 | Debrailly et al. | |
| 2005/0124447 A1 | 6/2005 | Message et al. | |
| 2005/0165397 A1 | 7/2005 | Faus et al. | |
| 2005/0235513 A1 | 10/2005 | Niarfeix | |
| 2005/0265646 A1 | 12/2005 | Arnault | |
| 2006/0011445 A1 | 1/2006 | Bussit et al. | |

FOREIGN PATENT DOCUMENTS

| | | |
|---|---|---|
| DE | 9418459 | 2/1995 |
| DE | 29708535 | 8/1997 |
| DE | 19637585 | 3/1998 |
| DE | 19809074 | 1/1999 |
| DE | 10011820 | 9/2001 |
| DE | 10042677 | 3/2002 |
| DE | 10148388 | 4/2003 |
| EP | 399855 | 11/1990 |
| EP | 0511105 | 10/1992 |
| EP | 0520853 | 12/1992 |
| EP | 0553716 | 8/1993 |
| EP | 806851 | 11/1997 |
| EP | 823267 | 2/1998 |
| EP | 930505 | 7/1999 |
| EP | 0930505 | 7/1999 |
| EP | 992797 | 4/2000 |
| EP | 0992797 | 4/2000 |
| EP | 1146244 | 10/2001 |
| EP | 1164358 | 12/2001 |
| EP | 1037051 | 12/2004 |
| FR | 2 375 484 | 12/1977 |
| FR | 2577291 | 8/1986 |
| FR | 2602872 | 2/1988 |
| FR | 2611244 | 8/1988 |
| FR | 2655735 | 6/1991 |
| FR | 2688560 | 9/1993 |
| FR | 2 744 506 | 8/1997 |
| FR | 2754903 | 4/1998 |
| FR | 2772444 | 6/1999 |
| FR | 2813644 | 3/2002 |
| FR | 2819864 | 7/2002 |
| GB | 1580301 | 12/1980 |
| GB | 2054084 | 2/1981 |
| GB | 2153082 | 8/1985 |
| GB | 2156082 | 10/1985 |
| WO | 9850709 | 11/1998 |
| WO | 02052163 | 7/2002 |
| WO | 02052280 | 7/2002 |
| WO | 0142809 | 1/2004 |
| WO | 2004005937 | 1/2004 |

OTHER PUBLICATIONS

Rapport D'Examen Preliminaire International for PCT/FR03/01985, Date d'achevement du present rapport Dec. 9, 2004 (7 pages).

Preliminary Search Report for FR 0208263, completed on Mar. 27, 2003 (2 pages).

Allan, Roger, "Coil-Based Micromachined Sensor Measures Speed and Position for Automotive Applications", Electronic Design, Penton Publishing, Cleveland, OH, US, vol. 44, No. 26, Dec. 16, 1996, pp. 34, 35, and 37.

International Search Report for PCT/FR 03/00264 mailed on May 28, 2003 (2 pages).

International Search Report for PCT/FR 02/00359 mailed on Jul. 3, 2003 (5 pages).

French Search Report for FR 0302363 mailed on Oct. 6, 2003 (2 pages).

European Search Report for EP 04290379, research completed on May 19, 2004 (2 pages).

U.S. Appl. No. 10/520,384, filed Jan. 3, 2005, entitled "Instrumented Antifriction Bearing and Electrical Motor Equipped Therewith" to Gallion et al. available in Private Pair.

U.S. Appl. No. 10/548,866, filed Sep. 9, 2005, entitled "Sensor Unit, and Housing Relay for the Production of Said Unit" to Landrieve, available in Private Pair.

U.S. Appl. No. 10/551,167, filed Sep. 27, 2005, entitled "Portable Measuring Device for Use in Sport" to Franck, available in Private Pair.

U.S. Appl. No. 10/552,375, filed Jan. 18, 2005, entitled "Freewheel Bearing Device and Freewheel Pulley" to Girardin, available in Private Pair.

U.S. Appl. No. 10/562,476, filed Dec. 21, 2005, entitled "Bearing Support With an Instrumented Movement and Coder for an Information Recorder Unit" to Gallion et al., available in Private Pair.

English translation of DE 10011820 (1 page).

English translation of DE 10042677 (1 page).

English translation of DE 10148388 (1 page).

English translation of DE 19637585 (1 page).

English translation of DE 29708535 (1 page).

English translation of EP 399855 (1 page).

English translation of EP 511105 (1 page).

English translation of EP 520853 (1 page).

English translation of EP 823267 (1 page).

English translation of FR 2577291 (1 page).

English translation of FR 2602872 (1 page).

English translation of FR 2611244 (1 page).

English translation of FR 2655735 (1 page).
English translation of FR 2688560 (1 page).
English translation of FR 2772444 (1 page).

English translation of FR 2819864 (1 page).

* cited by examiner

FIG_1

FIG_2

FIG_3

FIG_4

FIG_5

FIG_8

FIG_11

FIG_12

MOUNTING BRACKET, ROLLING BEARING AND CORRESPONDING ASSEMBLY METHOD

BACKGROUND OF THE INVENTION

1. Field of the Invention

The subject of the present invention is a mounting bracket of the type used for mounting a sensor or encoder system on a race of an instrumented rolling bearing, and a corresponding assembly method.

2. Description of the Relevant Art

An instrumented rolling bearing generally includes a rotating race, a nonrotating race, an encoder system mounted on the rotating race, and a sensor system mounted on the nonrotating race. The means for mounting the sensor or encoder system on a race must make it possible to prevent poor mounting that would lead to measuring errors or uncoupling between the sensor or encoder system and the corresponding race, rendering the instrumented rolling bearing unusable.

Document FR 0 376 771 discloses a bracket for the sensor system of an instrumented rolling bearing including a drum cut at one end into a plurality of circumferentially spaced elastic tongues, each tongue being provided at its free end with a hook projecting into a groove in the nonrotating race. The bracket is mounted on the nonrotating race by radial interference between the hooks and the groove. During assembly, the bracket is pressed axially against the nonrotating race. The elastic tongues are deformed by flexing radially to allow the hooks to pass and the bracket and race to be brought toward one another axially. On their hooks are located facing the groove, the tongues assume their initial position, the hooks projecting into the groove.

Since the tongues are small in length, considerable force must be exerted to achieve flexing of the tongues so that the hooks can be latched into place. The flexing of the tongues required for the passage of the hooks additionally depends on the radial interference between the hooks at the nonrotating race. Too much radial interference results in considerable assembly effort, leading to the risk of the tongues breaking during the assembly. Too little radial interference makes it easier to assemble the bracket on the race but entails the risk of poor mounting of said bracket and of uncoupling between the bracket and the race. Moreover, radial interference is difficult to control since it depends on the manufacturing tolerances of the race and of the bracket.

Such a mounting bracket is therefore not satisfactory since it presents risks of breaking during its assembly and risks of inadequate mounting during its use.

SUMMARY OF THE INVENTION

Described herein is a mounting bracket allowing secure and reliable mounting on an axisymmetric element without risks of the mounting bracket breaking during its assembly.

Also described is a mounting bracket allowing assembly with deformation using small applied forces preventing any risk of the mounting bracket breaking.

Additionally, a bracket allowing mounting on an axisymmetric element with locking of the bracket to prevent inadvertent disassembly is also described.

Such a bracket includes a part for mounting the bracket on an axisymmetric element, said mounting part including a body in the general shape of a ring and provided with an annular radial projection, the body including an opening allowing a variation in the diameter of said body during assembly so as to engage the projection in a corresponding groove in the axisymmetric element to allow mounting by radial interference, a locking means being capable, after assembly thereof, of prohibiting any such variation in the diameter of the body.

The formation of an opening in the body allows a variation in the diameter of the body by bringing toward one another the edges of the body delimiting the opening. The diameter of the body is varied using little force while allowing the variation in the diameter to be sufficient to allow the passage of the annular projection toward the corresponding groove in the axisymmetric element without risking the breaking of the body or of the annular projection. When the annular projection is located facing the groove, the body assumes its initial shape. The projection is introduced into the groove, with a slight clearance or with clamping, to retain the bracket on the axisymmetric element by radial interference. The simple assembly without risk of the bracket breaking makes it possible to provide an annular projection allowing, after assembly, considerable radial interference capable of ensuring that the mounting part is suitably retained on the axisymmetric element.

In one embodiment, the annular projection is interrupted in an angular sector diametrically opposed to the opening. The annular projection is thus divided into two attachment sectors. The use of a continuous annular projection in extended angular sectors makes possible improved retention of the mounting part on the axisymmetric element. Interruption of the annular projection in an angular sector diametrically opposed to the opening makes it possible to limit the force necessary to vary the diameter of the body. Interruption of the projection additionally makes it possible to facilitate the latching into place of the projection during assembly of the bracket while facilitating the passage of the projection.

In one embodiment, the body includes lugs projecting radially outward from a region situated close to edges delimiting the opening. The lugs projecting radially outward facilitate the application of a force for varying the diameter of the body. The lugs may also serve as a mounting portion for elements borne by the mounting bracket.

In one embodiment, the locking means includes a rigid portion whose shape matches the opening and which is capable of being inserted into the opening. Once the locking means has been inserted into the opening, it prohibits the edges of the body delimiting the opening from being pulled together and consequently prohibits a reduction in the diameter of the body, which prevents detachment of the mounting bracket. Such a locking means is suitable in the case where the bracket is mounted on the axisymmetric element as a result of a reduction in the diameter of the body.

In one embodiment, the locking means includes a rigid element bearing on at least one cylindrical supporting surface of the body. The rigid element, bearing on a cylindrical supporting surface, prohibits radial extension or contraction deformation of the cylindrical supporting surface, and therefore of the body.

In one embodiment, the body includes an axial cylindrical extension forming a locking cylindrical supporting surface.

Advantageously, the locking means includes a disk portion bearing on an inner cylindrical supporting surface of the axial cylindrical extension. The disk portion is designed to prohibit a reduction in the diameter of the body.

Advantageously, the locking means includes a rigid cap provided with an annular groove capable of engaging with the axial cylindrical extension. Since the axial cylindrical extension projects into an annular groove in a rigid cap, the latter prohibits an increase or a decrease in the diameter of the body.

The invention also relates to an instrumented rolling bearing device including a nonrotating race and a sensor means, a rotating part including a rotating race and an encoder means, rolling elements arranged between raceways of the rotating race and nonrotating race, the sensor means additionally including a bracket for mounting it on the nonrotating race according to one aspect of the invention.

Advantageously, the locking means and/or the body of the bracket bears detection elements of the sensor means. The locking means and/or the body of the bracket may also bear means for processing a measurement signal of the type transmitted by one or more detection elements. Preferably, the locking means includes a connection portion including connection means for the purpose of transmitting signals corresponding to rotation parameters.

The invention also relates to a method of assembling an instrumented rolling bearing including a nonrotating part including a nonrotating race and a sensor means, a rotating part including a rotating race and an encoder means, rolling elements arranged between raceways of the rotating race and nonrotating race, in which method the sensor means is mounted on the nonrotating race with the aid of a bracket by varying the diameter of a body of the bracket and engaging a projection of the body in a corresponding groove in the nonrotating race to allow mounting by radial interference, and any variation in the diameter of the body is prohibited with the aid of a locking means.

BRIEF DESCRIPTION OF THE DRAWINGS

The present invention and its advantages will be better understood by studying the detailed description of embodiments given by way of nonlimiting examples and illustrated by the appended drawings, in which.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
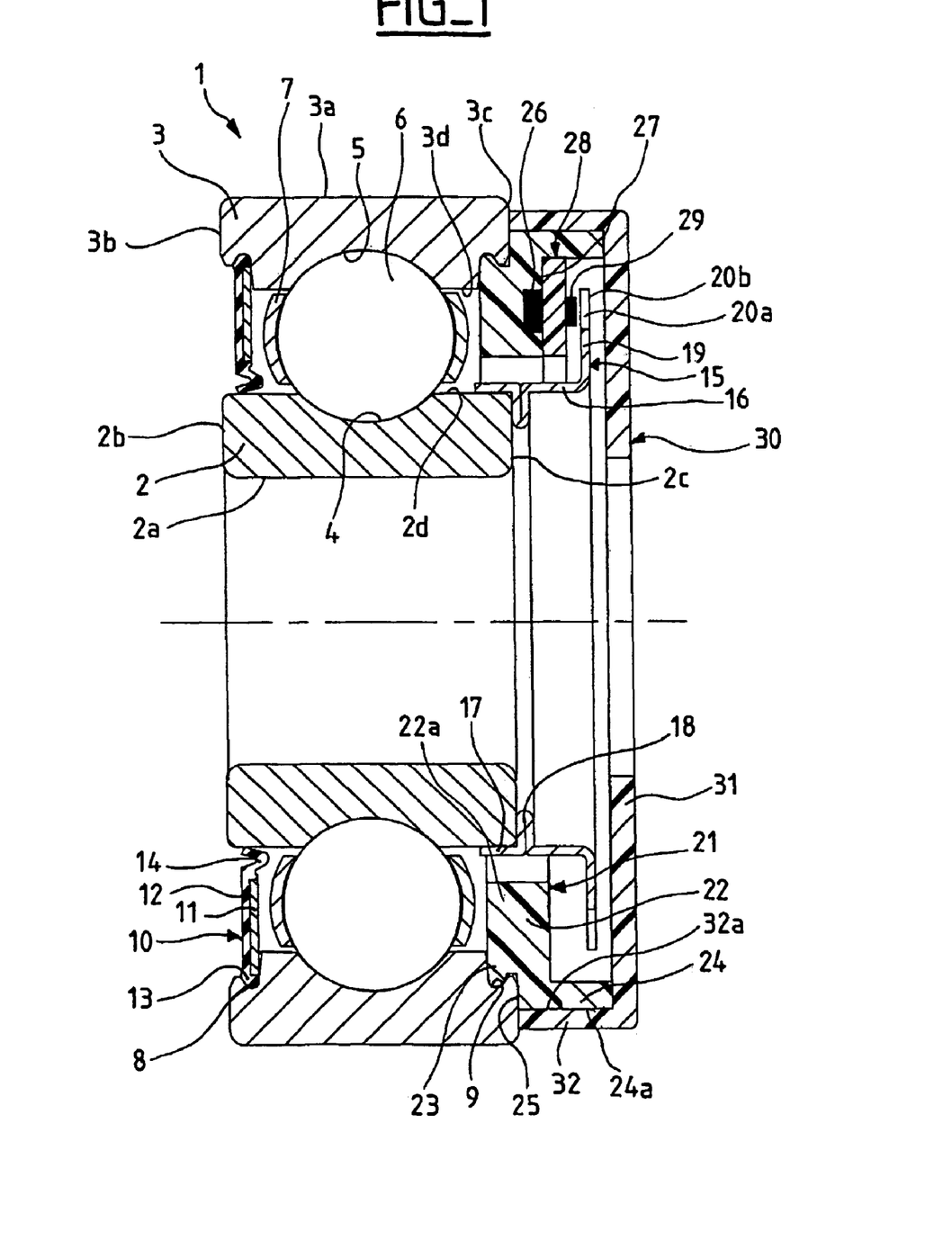
FIG. 1 is a view in axial section of an instrumented rolling bearing including a bracket according to one aspect of the invention.

In FIG. 1, an instrumented rolling bearing, referenced 1 in its entirety, includes a rotating inner race 2 and a nonrotating outer race 3. The rotating race 2 is provided with a bore 2a, with lateral radial faces 2b, 2c, and with a toroidal raceway 4 formed on an outer cylindrical surface 2d. The nonrotating race 3 includes an outer cylindrical surface 3a, lateral radial faces 3b, 3c and a toroidal raceway 5 formed on an inner surface 3d. Rolling elements 6, in this case balls, are arranged between the raceways 4,5 of the rotating race 2 and nonrotating race 3. The rolling elements 6 are kept circumferentially spaced by a cage 7.

The nonrotating race 3 includes, on its inner surface 3d, a first annular groove 8 situated axially close to one lateral face 3b and a second annular groove 9 situated axially close to the other lateral face 3c and being symmetrical to the annular groove 8 with respect to a radial plane passing through the center of the rolling elements 6.

The rolling bearing 1 includes a sealing member 10 provided with a rigid reinforcement 11 and with an elastic part 12 overmolded on the rigid reinforcement 11. The elastic part 12 includes a bulge 13 projecting into the groove 8 from the region of greatest diameter of the elastic part 12, for the purpose of mounting the sealing member 10 on the nonrotating race 3. The elastic part 12 also includes a sealing lip 14 extending from the region of smallest diameter of the elastic part 12 and coming, by way of its free edge, into frictional contact with the outer surface 2d of the rotating race 2.

The instrumented rolling bearing 1 includes an encoder means in the form of an encoder ring 15, made of magnetic sheet for example, fixed to the rotating race 2. The encoder ring 15 has the general shape of a cup of L-shaped cross section, including a tubular portion 16 of which a free end 17 is fitted on to the outer surface 2d of the rotating race 2. An inwardly extending radial portion 18 is formed by folding an intermediate portion of the tubular portion 16. The end 17 of the tubular portion 16 is fitted on to the rotating race 2 such that the radial portion 18 is in axial contact with the lateral surface 2c of the rotating race 2.

The encoder ring 15 includes a radial portion 19 extending outward from that end of the tubular portion 16 opposite the end 17. On its free edge of greatest diameter the radial portion 19 includes encoding notches 20a forming tongues 20b which alternate circumferentially with said notches 20a.

A sensor system includes a mounting bracket 21 including a body 22 and synthetic material and in the general shape of an open ring, surrounding the tubular portion 16 of the encoder ring 15 and being situated axially between the rolling elements 6 and the radial portion 19 of the encoder ring 15. The end 22a of the body 22 opposed to the radial portion 19 is situated projecting into the space enclosed between the rotating race 2 and nonrotating race 3. The bracket 21 includes an annular projection 23 extending radially outward from the periphery of the end 22a of the body 22. The annular radial projection 23 has a shape matching that of the groove 9 of the nonrotating race 3 and is engaged in the groove 9 in order to mount the bracket 21 on the nonrotating race 3. The bracket 21 includes an axial cylindrical protrusion 24 of generally annular shape extending on the opposite side to a radial surface 25 of the body 22 in contact with the lateral face 3c of the nonrotating race 3.

A magnet 26 is embedded in the body 22 flush with a radial surface 27 oriented toward the radial portion 19 of the encoder ring 15. The magnet 26 is situated radially facing the notches 20a and the tongues 20b. The bracket 21 additionally includes a locking ring 28, which will be described later, bearing a detection member 29 situated axially between the magnet 26 and the radial portion 19 of the encoder ring 15 and radially facing the notches 20a and tongues 20b of the encoder ring 15.

The rolling bearing 1 includes a protective cap 30 of generally annular shape for protecting the encoder and sensor means, this cap being made of synthetic material and including an annular radial portion 31 situated on that side of the portion 19 of the encoder ring 15 directed away from the bracket 21. The cap 30 includes a tubular portion 32 surrounding the axial cylindrical protrusion 24 of the bracket 21. An outer cylindrical supporting surface 24a of the axial cylindrical protrusion 24 is in contact with a bore 32a of the tubular portion 32. The axial cylindrical protrusion 24 has an outside diameter which is smaller than the diameter of the outer surface 3a of the nonrotating race 3. The cap 30 is placed on the bracket 21 and pushed in axially until the free edge of the tubular portion 32 comes into axial contact against the lateral surface 3c of the nonrotating race 3. The free end of the axial cylindrical protrusion 24 comes close to or in contact with the radial portion 31. The inside diameter of the radial portion 31 is between the diameter of the bore 2a of the rotating race 2 and the diameter of the tubular portion 16 of the encoder ring 15.

Figure 6:
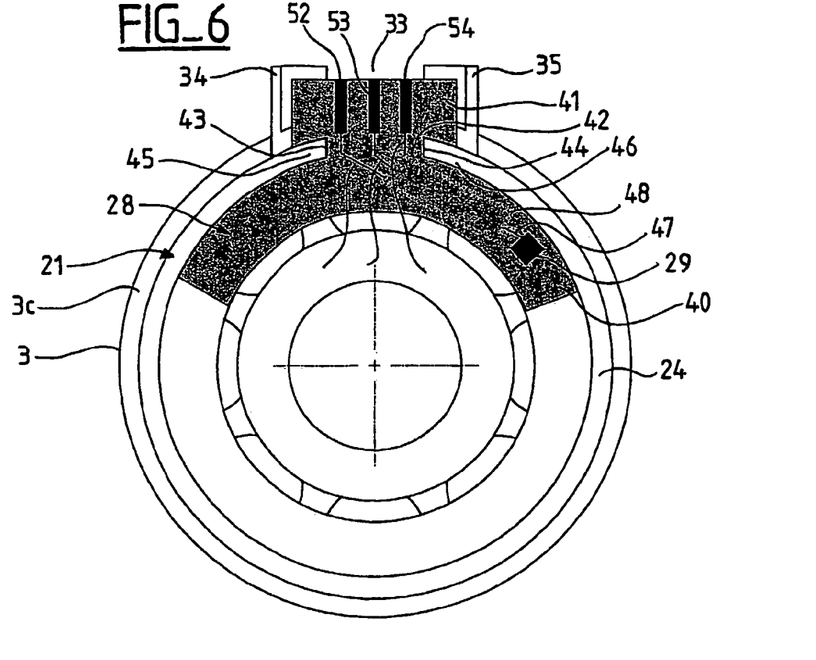
FIG. 6 is a front elevation view of the rolling bearing of FIG. 1 during a third step of assembling the bracket.

As can be seen more clearly from FIG. 6, the locking means 28 includes a disk portion 40 bearing on an inner cylindrical supporting surface 24b of the axial cylindrical protrusion 24 of the bracket 21, in an angular sector on either side of the opening 33. The locking means 28 is entirely rigid and includes a radial connection portion 41 situated radially facing the lugs 34, 35 of the bracket 21 and being joined to the disk portion 40 via a narrower radial central portion 42 forming notches 43, 44 between the connection portion and the disk portion 40. The ends 45, 46 of the axial cylindrical protrusion 24 which are adjacent to the opening 33 project into the notches 43, 44, being of matching shape with the latter. The notches 43, 44 may be designed such that the locking means can be assembled with clamping between the ends 45, 46. The locking means 28 is contact axially in contact against the radial surface 27 of the body 22.

The thickness of the disk portion 40 is smaller than the axial distance between the surface 27 of the cap oriented toward the radial portion 19 of the encoder ring 15 and said radial portion 19. The outside diameter of the disk portion 40 is substantially equal to the inside diameter of the axial cylindrical protrusion 24 of the cap 22. The inside diameter of the disk portion 40 is substantially greater than the diameter of the tubular portion 16 of the encoder ring 15. The disk portion 40 extends over an angular sector which may be between 10° and 360°.

The detection member 29 is borne by the disk portion 40, being offset angularly with respect to the opening 33. The detection member 29 is joined by way of an electrical connection 47 to processing means 48 mounted on the disk portion 40. The processing means 48 are joined by electrical connections 49, 50, 51 to connection means 52, 53, 54 in the form of pins or tongues arranged in or on the connection part 41. When the rotating race 2 rotates with respect to the nonrotating race 3, the detection member 29 sends a measurement signal to the processing means 48, which transmit signals corresponding to the rotation parameters of the rotating race 2 with respect to the nonrotating race 3. The angular positioning of the detection member 29 is ensured by the interaction of the locking means 28 with the ends 45, 46 of the axial cylindrical protrusion 24, prohibiting angular displacement of the locking means 28 with respect to the bracket 21.

The locking means 28 serves as support for sensor means of the instrumentation system of the rolling bearing 1. The central part 42 of the locking means 28 prohibits the edges 45, 44 of the axial cylindrical protrusion 24 from being brought toward one another. As a consequence, the locking means 28 prohibits elastic deformation of the body 22 that reduces the diameter of the body 22. The locking means may therefore be advantageously produced from the printed circuit board, the substrate of the board providing the mechanical lock function while the components supported by it provide the detection and/or signal processing and/or connection functions.

During the rotation of the rotating race 2, the notches 20a and tongues 20b of the encoder ring 15 rotate past the detection member 29 which they face. The notches 22 disturb the magnetic field produced by the magnet 26. The magnetosensitive detection member 29 detects the variations in magnetic field and transmits the corresponding measurements to processing means which make it possible to know, for example, the angular displacement, speed or acceleration of the rotating race 2 with respect to the nonrotating race 3. Of course, it is possible to provide different detection means, for example of the optical type, associated with an encoder ring provided with alternating reflecting and nonreflecting regions.

Figure 2:
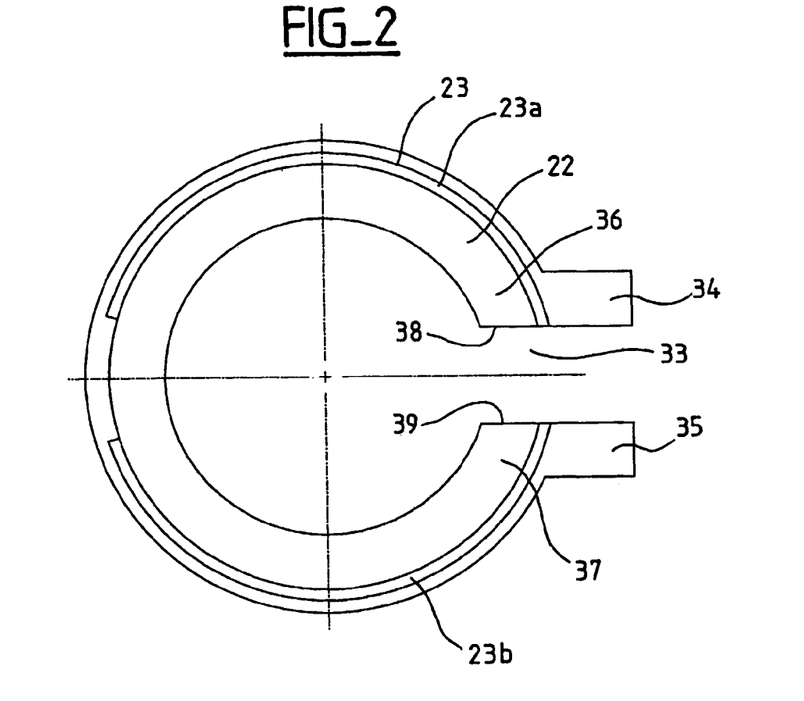
FIG. 2 is a front elevation view of the bracket of FIG. 1.

As can be seen from FIG. 2, the bracket 21 includes an opening 33. The annular radial projection 23 is interrupted in an angular sector opposed to the opening 33. The annular projection 23 is separated into two diametrically opposite sectors 23a and 23b. The bracket 21 includes lugs 34, 35 projecting radially outward from regions 36, 37 situated close to edges 38, 39 of the body 22 delimiting the opening 33. The opening 33 gives the bracket 21 a certain radial flexibility.

Figure 3:
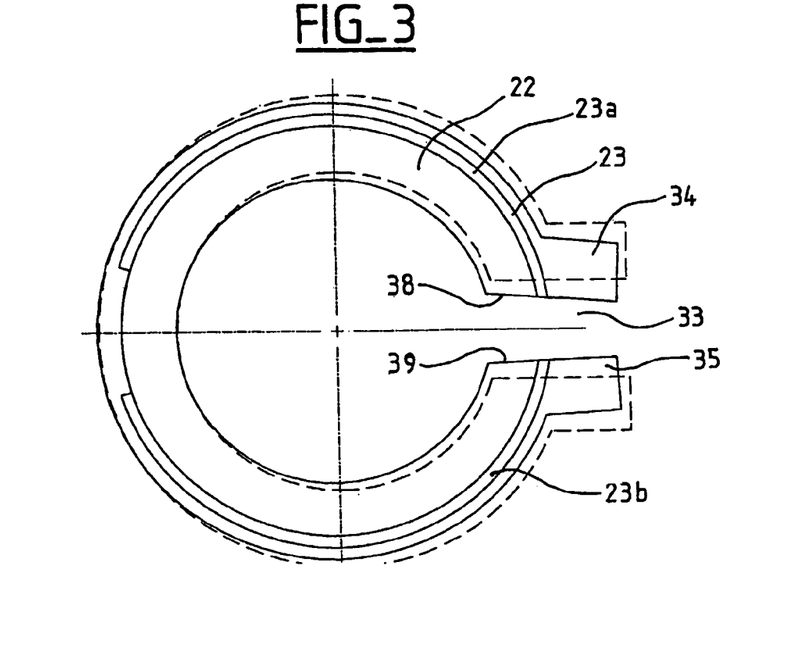
FIG. 3 is a front elevation view of the bracket of FIG. 2 when deformed.

FIG. 3 shows the bracket 21 in a configuration in which the diameter of the body 22 has been reduced by application of a force and elastic deformation. To achieve this, a force may be applied to the lugs 34, 35 which brings them toward one another. The sectors 23a, 23b of the annular projection 23 are brought radially toward one another so as to allow them to pass into the space enclosed between the rotating race 2 and nonrotating race 3 until they come to face the groove 9 in which they will be introduced when the body 22 has resumed its initial shape. The position of the bracket 21 corresponding to the initial position of the body 22 has been shown in dashed lines.

Figure 4:
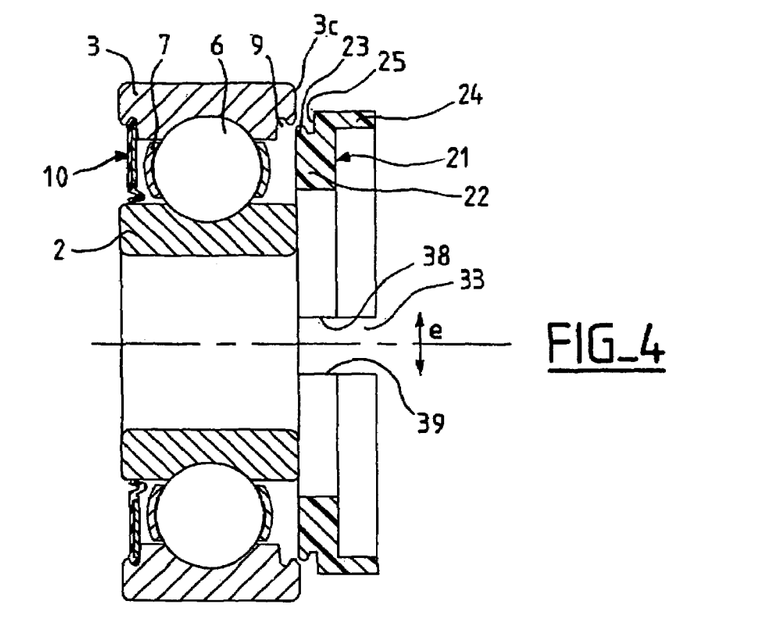
FIG. 4 is a view in axial section of the rolling bearing of FIG. 1 during a first step of assembling the bracket.

In FIG. 4 the rolling bearing 1 is partially assembled and includes the rotating race 2 and nonrotating race 3, the rolling elements 6, the cage 7, and the sealing member 10. The bracket 21 is deformed elastically in order to reduce its diameter, as represented in FIG. 3. The bracket 21 is presented facing the space between the rotating race 2 and nonrotating race 3 so that it can be brought axially toward this space and mounted in the groove 9.

Figure 5:
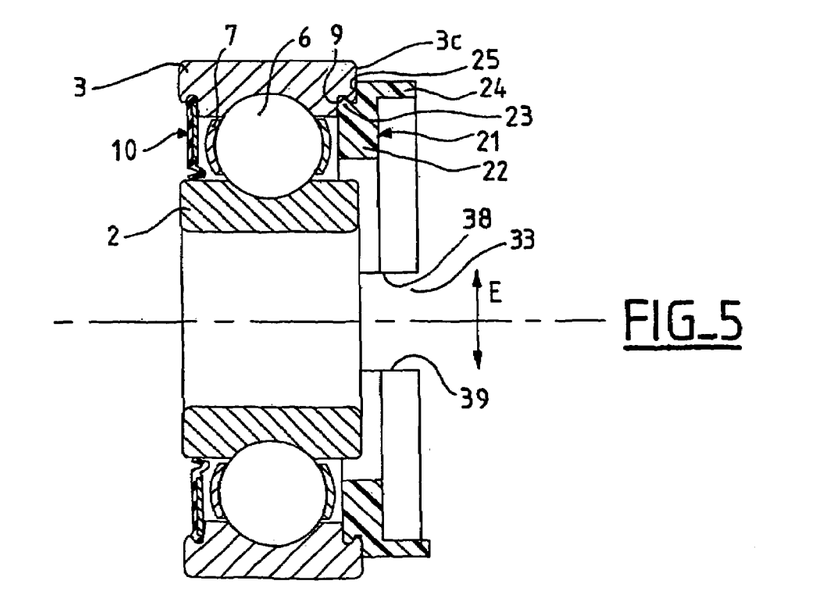
FIG. 5 is a view in axial section of the rolling bearing of FIG. 1 during a second step of assembling the bracket.

In FIG. 5 the bracket 21 has been introduced axially into the space enclosed between the rotating race 2 and the nonrotating race 3 until the shoulder 25 of the axial cylindrical protrusion 24 comes into contact with the lateral surface 3c of the outer race 3. The force exerted on the lugs 34, 35 is released and the bracket 21 resumes its initial shape, the sectors 23a, 23b of the annular projection 23 projecting into the annular groove 9 of the nonrotating race 3. After the bracket 21 has returned to its initial position, the spacing E between the edges 38, 39 delimiting the opening 3 (FIG. 5) is greater than the spacing e between these same edges 38, 39 during the preceding step of axially inserting the bracket (FIG. 4).

During a third assembly step illustrated by FIG. 6, the locking means 28 is assembled on the bracket 21 in order to prohibit a reduction in diameter of the bracket 21 so as to avoid uncoupling between the bracket 21 and the nonrotating race 3. The locking means 28 thus prevents undesired uncoupling between the bracket 21 and the nonrotating race 3. The locking means 28 is preferably assembled with slight clamping.

The bracket 21 including a body 22 of generally annular shape provided with an opening 33 may be easily deformed elastically in order to reduce the diameter of the body 22 without risking the latter breaking. It is thus possible to provide an annular projection 23 allowing considerable radial interference by engaging in the groove 9 of the nonrotating race 3 and ensuring reliable mounting of the nonrotating race and of the bracket 21, the ease of assembling the bracket 21 being maintained by virtue of the bracket being sufficiently deformed without considerable force leading to the risk of the bracket 21 breaking. In particular, sufficient radial interference for mounting can be provided in spite of variations in diameter due to manufacturing tolerances.

Figure 7:
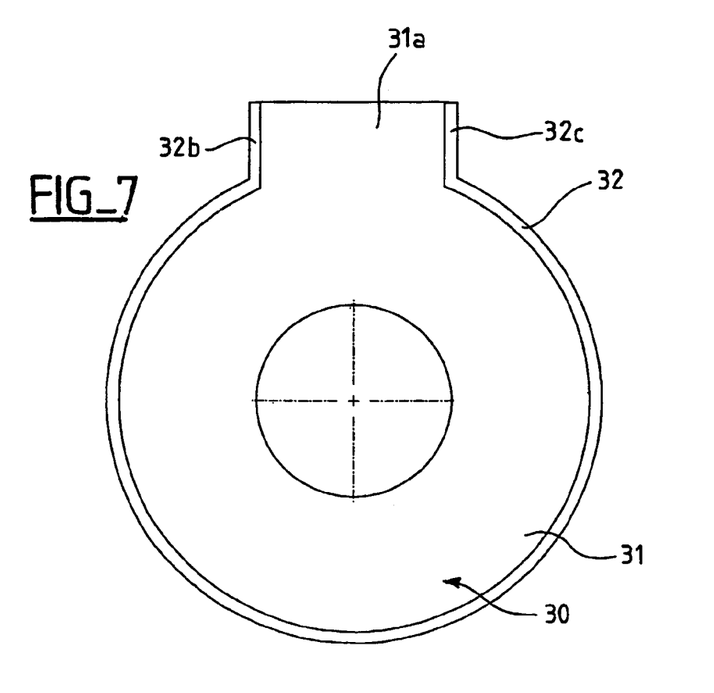
FIG. 7 is a front view of a cap intended for the bracket.

During a subsequent assembly step, the cap 30 is placed on the bracket 21 by way of its tubular portion 32 and the latter is fitted onto the axial cylindrical protrusion 24 of the bracket 21. As can be seen more clearly from FIG. 7, the cap 30 includes a radial protrusion 31a for protecting the connection part 41 of the locking means 28, coming radially to face said connection part 41. The tubular portion 32 is interrupted in the angular sector of the radial protrusion 31a, being extended radially outward by edges 32b, 32c situated on either side of the radial protrusion 31a.

Figure 8:
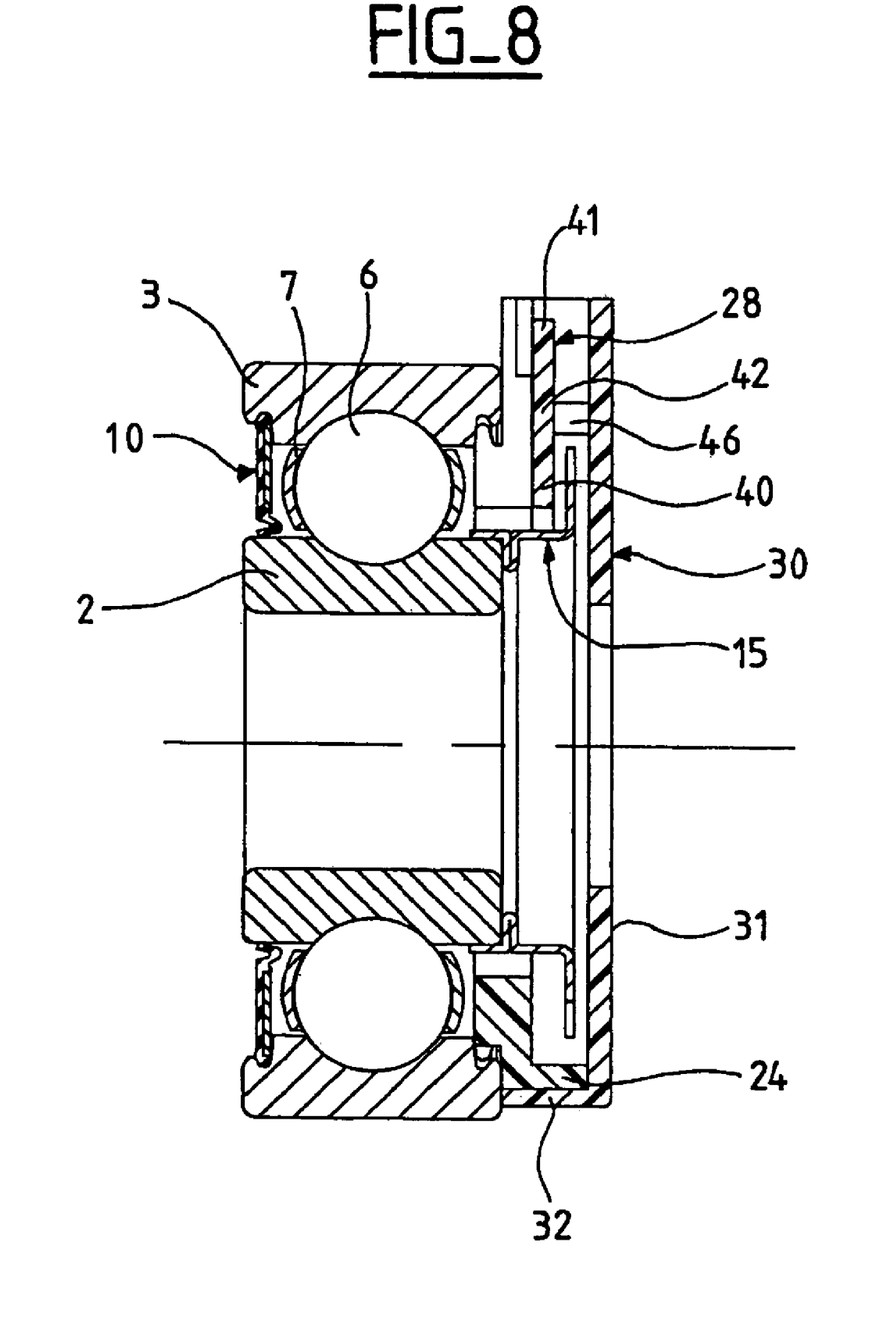
FIG. 8 is a view in axial section of the rolling bearing of FIG. 6 equipped with the cap of FIG. 7.
Figure 9:
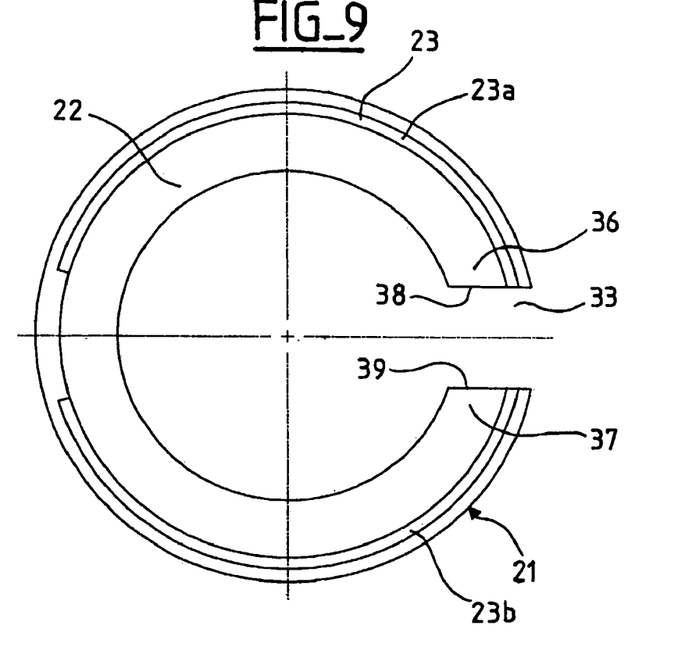
FIG. 9 is a front elevation view of a bracket according to a second embodiment.

FIG. 8 shows a view in cross section of the completely assembled rolling bearing 1 in an axial cutting plane passing through the opening 33 and through the interruption of the annular projection 23. The central part 42 of the locking means is situated between the edges of the axial cylindrical protrusion, one edge 46 of which is visible between the central part 42 and the radial portion 31 of the cap 30.

The locking means 28 prohibits deformation of the bracket 21 by prohibiting the edges of the body 22 delimiting the opening 23 from moving toward one another. In another embodiment, a more angularly extended disk portion 40 is provided such that it bears against a portion of the inner supporting surface 24c of the axial cylindrical protrusion 24 which is sufficiently extended to prohibit a reduction in the diameter of the body 22. For example, the disk portion 40 may extend over an angular sector of between 190° and 360°.

The deformation of the body 22 by exerting a force which brings the edges 37, 38 delimiting the opening 33 toward one another is manifested by the attachment sectors 23a, 23b being brought diametrically toward one another as a result of the portions of the body 22 which are situated on either side of the opening 33 being brought substantially toward one another. The whole of that portion of the body 22 diametrically opposed to the opening undergoes less considerable radial deformation, as is represented in FIG. 3. The interruption of the projection 23 makes it possible to reduce the rigidity of the body to a certain extent. Moreover, since the axis passing through the opening 33 and the interruption of the projection 23 is an axis of lesser radial deformation of the body 22 when the edges 37, 38 delimiting the opening 33 are brought toward one another, the interruption of the projection 23, associated with the opening 33, makes it possible to reduce the diameter of the projection along this axis in order to facilitate assembly of the bracket 21.

Attachment sectors 23a, 23b extended angularly over, for example, 10° to 170° make it possible to provide secure mounting, the projection being rigid and the mounting forces being distributed. Of course, it would be possible to provide a projection divided into three or more attachment sectors without departing from the scope of the invention.

Figure 10:
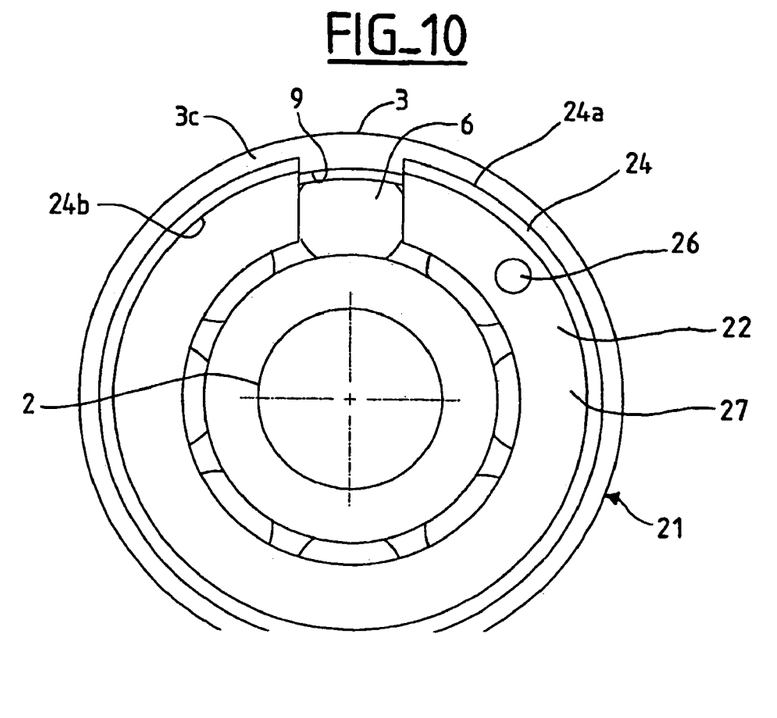
FIG. 10 is a front elevation view of an instrumented rolling bearing equipped with the bracket according to FIG. 9.

In FIGS. 9 to 12 the references to like elements in FIGS. 1 to 8 have again been used. In this embodiment, the bracket 21 (FIG. 9) is similar to the bracket of the previous embodiment, apart from the fact that it is without lugs. FIG. 10 illustrates a rolling bearing 1 on which the bracket 21 is mounted. The magnet 26 flush with the radial surface 27 of the body 22 is offset angularly with respect to the opening 33 of the body 22.

Figure 12:
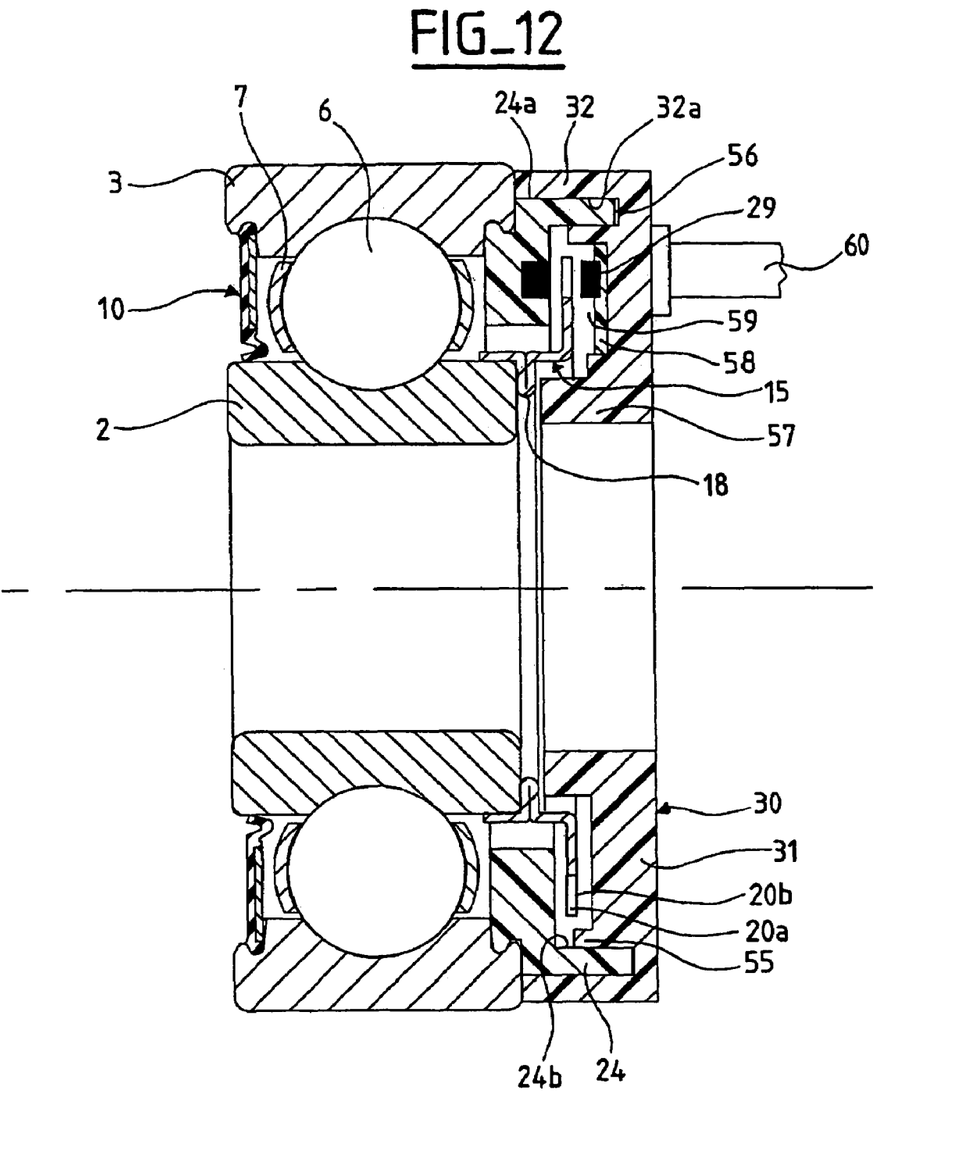
FIG. 12 is a view in axial section of the device of FIG. 11 after assembly.

In FIG. 12 the cap 30 includes a tubular portion 32 surrounding the axial cylindrical protrusion 24. A bore 32a of the tubular portion 32 is in contact with an outer cylindrical supporting surface 24a of the axial cylindrical protrusion 24. An annular bulge 55 extends from a radial portion 31 of the cap 30 in the direction of the rolling elements, forming an annular groove 56 in which the free end of the axial cylindrical protrusion 24 is engaged. The axial cylindrical protrusion 24 forms an inner cylindrical supporting surface 24b in contact with the outer surface of the bulge 55. The cap 30 includes a tubular central portion 57 extending axially toward the rotating race 2, from the region of smallest diameter of the radial portion 31. The tubular central portion 57 extends close to the radial portion 18 of the encoder ring 15 to form a narrow sealing passage.

A processing board 58 is housed in a recess 59 in the radial portion 31 situated facing the radial portion 19 of the encoder ring 15. The board 53 bears a detection member 29 situated facing the magnet 26, on the opposite side of the radial portion 19 of the encoder ring 15. In this position, the detection member 29 detects the variations in the magnetic field created by the magnet 26, said variations being brought about by the encoding notches 20a and the tongues 20b of the radial portion 19 moving past between the magnet 26 and the detection member 29. The detection member 29 is connected in a way which has not been represented to a connection outlet 60 projecting axially from a face of the radial portion 31 directed away from the rolling bearing 1.

Figure 11:
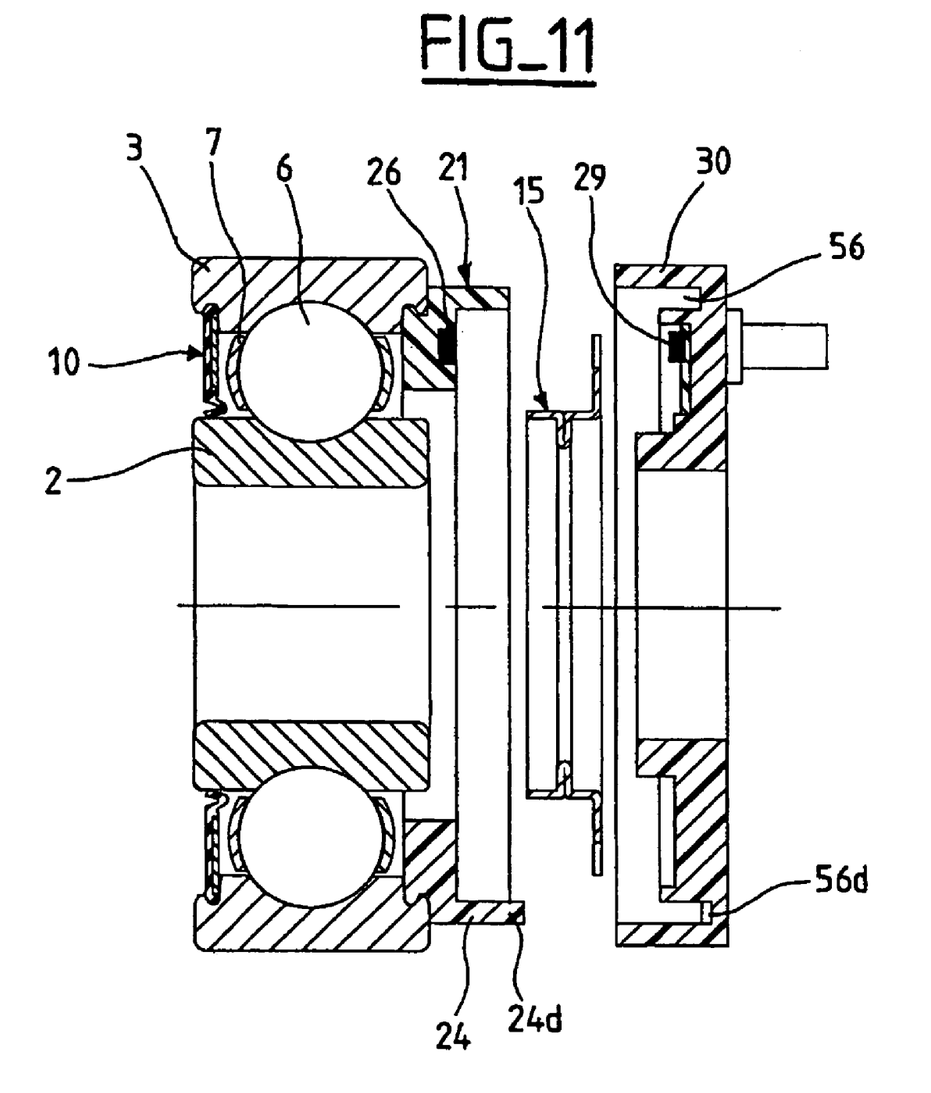
FIG. 11 is a view in axial section of the rolling bearing of FIG. 10 during a step of assembling a cap.

As illustrated by FIG. 11, since the bracket 21 is assembled on the nonrotating race 3, the encoder ring 15 is fitted onto the rotating race 2, and then the cap 30 is placed in such a way that the free end of the axial cylindrical protrusion 24 projects into the groove 56. Finally, the instrumented rolling bearing as represented in FIG. 12 is obtained. The groove 56 has a deeper region forming a notch 56d intended to interact with a tooth 24d projecting axially from the free edge of the axial cylindrical protrusion 24. The notch 56d and the tooth 24d form a means of axially indexing the cap 30 with respect to the bracket 21 in order to ensure that the detection member 29 is situated in an angularly correct position opposite the magnet 26.

When the cap 30 is assembled (FIG. 12), a variation in the diameter of the body 22 of the bracket 21 is prohibited by the cap 30. A reduction in the diameter of the bracket 21 causes a reduction in the diameter of the axial cylindrical protrusion 24, which then bears by its inner supporting surface 24b against the outer surface of the bulge 55. The bulge 55 of the cap 30 is rigid and prohibits a reduction in the diameter of the axial cylindrical protrusion 24. The cap 30 also prohibits an increase in the diameter of the body 22, because such an increase would be manifested by an increase in the diameter of the axial cylindrical protrusion 24, prohibited by the tubular portion 32 surrounding said axial cylindrical protrusion 24.

The lock function is provided by the bulge 55 made in one piece with the protective cap 30. The bulge 55 comes into contact with a cylindrical supporting surface of the bracket 21 to prevent a reduction in the diameter of the body 22 of the bracket. It is possible to conceive of other embodiments allowing the formation of a rigid part of the cap in contact with a cylindrical supporting surface of the bracket 21 in order to prevent a variation in the diameter of the bracket 21. For example, it is possible to provide an annular groove formed in that surface 27 of the body 22 oriented toward the cap 30, and a corresponding rib of the cap projecting into the annular groove, being in contact with a cylindrical supporting surface of the groove.

Embodiments have been described in which the bracket 21 is assembled on an axisymmetric element, in this case races of a rolling bearing, entailing deformation of the bracket 21 through a reduction in its diameter. In different embodiments, an increase in the diameter of the bracket may be required for its assembly. For example, it may be desired to mount a bracket by latching into a groove in an outer surface of an inner or outer race of a rolling bearing. It will then be required to provide an annular projection directed radially inward to interact with said groove. An increase in the bracket diameter will then be necessary to latch the annular projection into the groove. A locking means making it possible to prohibit an increase in the diameter of the body of the bracket will be provided.

By virtue of the invention, it is possible to obtain a bracket for mounting on an axisymmetric element which can be mounted on the support in a secure manner and without risk to the bracket while it is being assembled. The mounting bracket allows assembly on the mounting element with little force in relation to its breaking point, providing sufficient radial interference for mounting.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A bracket for mounting a sensor or encoder system on a race of a rolling bearing comprising a ring shaped body provided with an annular radial projection, the body comprising an opening allowing a variation in the diameter of said body during assembly so as to engage the projection in a corresponding annular groove provided on said race to allow mounting the bracket onto said race by radial interference and, a locking means being capable, after assembly thereof, of prohibiting any such variation in the diameter of the body.

2. The bracket as claimed in claim 1, wherein the annular projection is interrupted in an angular sector diametrically opposed to the opening.

3. The bracket as claimed in claim 1, wherein the body comprises lugs projecting radially outward from a region situated close to edges delimiting the opening.

4. The bracket as claimed in claim 1, wherein the locking means comprises a rigid portion whose shape matches the opening and which is capable of being inserted into the opening.

5. The bracket as claimed in claim 1, wherein the locking means comprises a rigid element bearing on at least one cylindrical supporting surface of the body.

6. The bracket as claimed in claim 5, wherein the body comprises an axial cylindrical extension forming a locking cylindrical supporting surface.

7. The bracket as claimed in claim 6, wherein the locking means comprises a disk portion bearing on an inner cylindrical supporting surface of the axial cylindrical extension.

8. The bracket as claimed in claim 6, wherein the locking means comprises a rigid cap provided with an annular groove capable of engaging with the axial cylindrical extension.

9. An instrumented rolling bearing device comprising a nonrotating race and a sensor means, a rotating part comprising a rotating race and an encoder means, rolling elements arranged between raceways of the rotating race and nonrotating race, wherein the sensor means comprises a bracket for mounting the sensor means on the nonrotating race the bracket comprising a part for mounting it on an axisymmetric element wherein the mounting part comprises a body in the general shape of a ring and provided with an annular radial projection, the body comprising an opening allowing a variation in the diameter of said body during assembly so as to engage the projection in a corresponding groove in the axisymmetric element to allow mounting by radial interference, a locking means being capable, after assembly thereof, of prohibiting any such variation in the diameter of the body.

10. The device as claimed in claim 9, wherein the locking means and/or the body of the bracket bears detection elements of the sensor means.

11. The device as claimed in claim 9, wherein the locking means and/or the body of the bracket bears means for processing a measurement signal.

12. The device as claimed in claim 9, wherein the locking means comprises a connection portion bearing connection means.

13. A method of assembling an instrumented rolling bearing comprising a nonrotating part comprising a nonrotating race and a sensor means, a rotating part comprising a rotating race and an encoder means, rolling elements arranged between raceways of the rotating race and nonrotating race, the method comprising mounting the sensor means on the nonrotating race with the aid of a bracket by varying the diameter of a body of the bracket and engaging a projection of the body in a corresponding groove in the nonrotating race to allow mounting by radial interference, and any variation in the diameter of the body is prohibited with the aid of a locking means.

* * * * *